(12) United States Patent  
Fleck

(10) Patent No.: US 9,007,277 B2  
(45) Date of Patent: Apr. 14, 2015

(54) TRANSPARENT DISPLAY ASSEMBLY

(75) Inventor: Rod G. Fleck, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1013 days.

(21) Appl. No.: 12/914,574

(22) Filed: Oct. 28, 2010

(65) Prior Publication Data

US 2012/0105306 A1 May 3, 2012

(51) Int. Cl.
*G09G 5/00* (2006.01)
*G09G 3/20* (2006.01)
*G06F 1/16* (2006.01)
*G06F 3/0488* (2013.01)

(52) U.S. Cl.
CPC ............... *G09G 3/20* (2013.01); *G06F 1/1643* (2013.01); *G06F 3/0488* (2013.01); *G09G 2300/023* (2013.01); *G09G 2310/0235* (2013.01)

(58) Field of Classification Search
CPC ....... G06F 1/1643; G06F 3/0488; G09G 3/20; G09G 2300/023; G09G 2310/0235
USPC .................................. 345/1.1–1.2, 3.1, 4–6
See application file for complete search history.

(56) References Cited

U.S. PATENT DOCUMENTS

| | | | |
|---|---|---|---|
| 5,896,575 A | 4/1999 | Higginbotham et al. | |
| 7,205,959 B2 | 4/2007 | Henriksson | |
| 7,701,517 B1 | 4/2010 | Geronimi | |
| 2004/0075628 A1 | 4/2004 | Chien et al. | |
| 2005/0024319 A1 | 2/2005 | Amirzadeh et al. | |
| 2005/0052342 A1 | 3/2005 | Wu et al. | |
| 2005/0195344 A1* | 9/2005 | Chang et al. | 349/114 |
| 2006/0044286 A1 | 3/2006 | Kohlhaas et al. | |
| 2008/0111958 A1* | 5/2008 | Kleverman et al. | 349/114 |
| 2008/0262910 A1 | 10/2008 | Altberg et al. | |
| 2009/0140950 A1 | 6/2009 | Woo et al. | |
| 2009/0295731 A1 | 12/2009 | Kim et al. | |
| 2010/0100842 A1 | 4/2010 | Kim | |

(Continued)

FOREIGN PATENT DOCUMENTS

| | | |
|---|---|---|
| CN | 1189047 | 2/2005 |
| CN | 1573448 | 2/2005 |

(Continued)

OTHER PUBLICATIONS

"PCT Search Report and Written Opinion", Application No. PCT/US2011/057479, (Apr. 10, 2012), 9 pages.

(Continued)

*Primary Examiner* — Michael Pervan
(74) *Attorney, Agent, or Firm* — Jeremy Snodgrass; Judy Yee; Micky Minhas

(57) ABSTRACT

In embodiments of a transparent display assembly, a display device includes a display panel system that is located between a first display surface and a second display surface, and the display panel system displays an image. The image is viewable through the first display surface and through the second display surface, where the second display surface and the first display surface are viewable from opposite sides of the display device. The display device also includes a multi-mode panel located between the first display surface and the second display surface. The multi-mode panel is operable to permit the image being viewable through the first and second display surfaces, and further operable to prevent the image from being viewable through the first display surface or the second display surface.

20 Claims, 4 Drawing Sheets

(56) References Cited

U.S. PATENT DOCUMENTS

| | | | |
|---|---|---|---|
| 2010/0141568 A1* | 6/2010 | Lee et al. | 345/88 |
| 2010/0144394 A1 | 6/2010 | Han et al. | |
| 2010/0265435 A1* | 10/2010 | Hwang et al. | 349/64 |
| 2010/0277439 A1* | 11/2010 | Charlier et al. | 345/176 |
| 2012/0019434 A1* | 1/2012 | Kuhlman et al. | 345/1.3 |
| 2012/0105428 A1 | 5/2012 | Fleck | |

FOREIGN PATENT DOCUMENTS

| | | |
|---|---|---|
| CN | 1240042 | 2/2006 |
| CN | 1879139 | 12/2006 |
| CN | 101533177 | 9/2009 |
| EP | 2169966 | 3/2010 |
| JP | 2002320012 | 10/2002 |
| WO | WO-2010126756 | 11/2010 |

OTHER PUBLICATIONS

Patel, Nilay "Double-Sided Transparent Touch Display would Make Battleship Amazing", Retrieved from: <http://www.engadget.com/2008/08/29/double-sided-transparent-touch-display-would-make-battleship-ama> on Jun. 21, 2010, (Aug. 29, 2008),4 pages.

Greene, Kate "Two-Sided Touch Screen", Retrieved from: <http://www.technologyreview.in/computing/19300/> on Jun. 21, 2010, (Aug. 24, 2007),4 pages.

Wu, Chung-Chih et al., "Advanced Organic Light-Emitting Devices for Enhancing Display Performances", *Journal of Display Technology*, vol. 1, No. 2, Available at <http://ntur.lib.ntu.edu.tw/bitstream/246246/148555/1/37.pdf>,(Dec. 2005),pp. 248-266.

"Non-Final Office Action", U.S. Appl. No. 12/914,761, Aug. 9, 2013, 13 pages.

"Foreign Office Action", CN Application No. 201110356030.2, Dec. 23, 2013, 11 pages.

"Foreign Office Action", CN Application No. 201110355941.3, Dec. 23, 2013, 12 Pages.

"Final Office Action", U.S. Appl. No. 12/914,761, Mar. 17, 2014, 15 pages.

"Foreign Office Action", CN Application No. 201110356030.2, Aug. 13, 2014, 12 Pages.

"Foreign Office Action", CN Application No. 201110355941.3, Aug. 13, 2014, 15 Pages.

"Foreign Office Action", AU Application No. 2011320628, Sep. 10, 2014, 3 pages.

"Foreign Office Action", CN Application No. 201110356030.2, Jan. 4, 2015, 12 Pages.

* cited by examiner

TRANSPARENT DISPLAY ASSEMBLY

BACKGROUND

Mobile phones and portable devices that display information when open or closed are typically implemented with two displays. For example, a mobile phone may have a larger, primary display for use when the device is open, and a smaller, secondary display on the back of the device to display the current time or a notification of an incoming call. The current flip, slide, or swivel type of phone devices allow a user to interact with all of the device functions when the primary display is open. However, many of the device functions may be limited or disabled when the primary display is closed over the device and/or when a smaller, secondary display is in use. Additionally, users typically want the smallest possible device to conveniently carry in a pocket or purse, but also want larger user interface surfaces for a primary display, keypad, and potentially a secondary display. Some tablet notebook computers and/or phones that have a single display may be used when in an open or closed position, but need relatively complex rotating hinges and hardware components to position the display screen for use while open or closed.

SUMMARY

This summary is provided to introduce simplified concepts of transparent display assembly that are further described below in the Detailed Description. This summary is not intended to identify essential features of the claimed subject matter, nor is it intended for use in determining the scope of the claimed subject matter.

Transparent display assembly is described. In embodiments, a display device includes a display panel system that is located between a first display surface and a second display surface, and the display panel system displays an image. The image is viewable through the first display surface and through the second display surface, where the second display surface and the first display surface are viewable from opposite sides of the display device. The display device also includes a multi-mode panel located between the first display surface and the second display surface. The multi-mode panel is operable to permit an image being viewable through the first and second display surfaces, and is further operable to prevent the image from being viewable through the first display surface or the second display surface.

In other embodiments, the display panel system can be implemented as an OLED panel, or as an LCD panel with a light source to illuminate the LCD panel for image display. The multi-mode panel may be implemented as an active reflector, or active diffuser, that can be switched on to prevent the image from being viewable through the first display surface or the second display surface, or switched off for transparency to permit the image being viewable through the first and second display surfaces. Alternatively, the multi-mode panel may be implemented as an active shutter that can be closed to prevent the image from being viewable through the first display surface or the second display surface, or opened for transparency to permit the image being viewable through the first and second display surfaces. In embodiments, the multi-mode panel may be implemented with any combination of an active reflector, an active diffuser, and/or an active shutter.

The display panel system can include a color filter system for a percentage of transparency that permits the image being viewable through the first and second display surfaces. The color filter system may also be implemented as an active color filter system or a passive color filter system. In various active color filter solutions, colors can be generated via backlight (e.g., with field sequential color), with color emitters, or with an electrowetting active color implementation. The display panel system can also include one or more polarizers of an LCD panel for a percentage of transparency that permits the image being viewable through the first and second display surfaces. A polarizer may also be implemented as an active polarizer or a passive polarizer. The display assembly may also include a display panel controller that controls the multi-mode panel for transparency of all of a display, a section of the display, a pixel of the display, or a set of pixels of the display. The display panel controller can also invert a viewable perspective of an image when the image is viewable through the second display surface.

In other embodiments, the display device includes a touch screen located between the first display surface and the second display surface, and the touch screen senses a touch input to either of the first display surface or the second display surface. Alternatively, the display device includes a first touch screen proximate the first display surface and a second touch screen proximate the second display surface. The first and second touch screens are implemented to sense touch inputs to the respective first and second display surfaces.

BRIEF DESCRIPTION OF THE DRAWINGS

Embodiments of transparent display assembly are described with reference to the following drawings. The same numbers are used throughout the drawings to reference like features and components.

DETAILED DESCRIPTION

Figure 1:
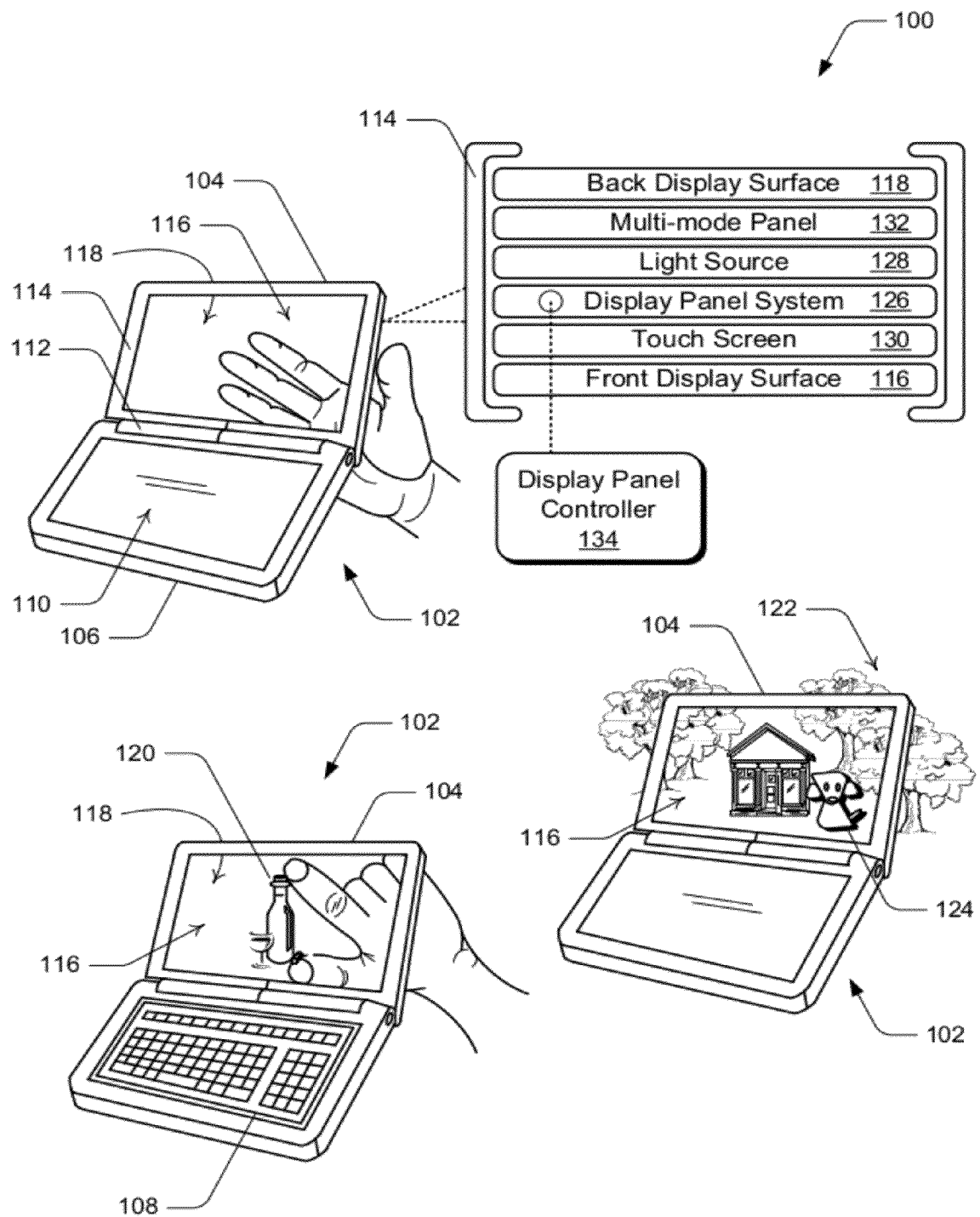
FIG. 1 illustrates examples of a portable device and various embodiments of transparent display assembly.

Embodiments of transparent display assembly are described. A portable device, such as a mobile phone or computer device, includes a display device that can be controlled for transparent and non-transparent display. Optionally, the portable device can also include an additional display device integrated into a handheld base of the portable device. The display device can be movably coupled to the handheld base so that the display device can be positioned to open and close over the handheld base. For example, the display device may open like the display of a notebook computer, slide up like on a slider phone, or flip up like on a flip phone. The display device includes a front display surface and a back display surface, and the front and back display surfaces are viewable from opposite sides of the display device. The display device also includes various display panels and surfaces that are assembled between the front and back display surfaces, and different combinations of the display panels and surfaces may be utilized to implement a transparent display. As described herein, the transparency of a display device may be a percentage of transparency as measured with light detection equipment and/or as visually determined or perceived by a user when viewing through the display device.

The assembly of a transparent display device can include a display panel system that is located between the front and back display surfaces of the display device, and the display panel system is implemented to display images. The display panel system can be implemented as a transparent OLED panel, or as a transparent LCD panel with a light source to illuminate the LCD panel for image display. The display panel system can include a color filter system for a percentage of transparency that permits an image being viewable through the display device, and may include one or more polarizers for a percentage of transparency that permits the image being viewable through the display device.

The assembly of a transparent display device also includes a multi-mode panel located between the front and back display surfaces, and the multi-mode panel is operable to permit a displayed image being viewable through the front and back display surfaces, and is operable to prevent the displayed image from being viewable through the front display surface or the back display surface. The multi-mode panel can be implemented as an active reflector, or active diffuser, that can be switched on to prevent an image from being viewable, or switched off for transparency to permit an image being viewable. Alternatively, the multi-mode panel may be implemented as an active shutter that can be closed to prevent an image from being viewable, or opened for transparency to permit the image being viewable. The multi-mode panel may also be implemented with an electrowetted panel. Any of the described multi-mode panel solutions, such as a reflector, diffuser, shutter, or electrowetted panel, can be implemented to operate on the whole panel, sections of the panel, and/or on a pixel-by-pixel basis.

The assembly of a transparent display device may also include a touch screen located between the front and back display surfaces of the display device, and the touch screen senses a touch input to either of the front display surface or the back display surface. Alternatively, the assembly can include a first touch screen proximate the front display surface and a second touch screen proximate the back display surface. The first and second touch screens sense touch inputs to the respective front and back display surfaces of the display device.

While features and concepts of the described systems and methods for transparent display assembly can be implemented in any number of different environments, systems, devices, and/or various configurations, embodiments of transparent display assembly are described in the context of the following example devices, systems, and configurations.

FIG. 1 illustrates examples 100 of a portable device 102 and various embodiments of transparent display assembly. The portable device includes a display device 104 and a handheld base 106 that may include a physical keyboard (shown at 108) or an additional display device 110 as an integrated component of the portable device. The additional display device may be utilized to display text, graphics, images, user interfaces, and/or a virtual keyboard, such as when an implementation of a portable device does not include a physical keyboard. In the examples, the display device 104 is movably coupled at 112 to the handheld base of the portable device, such as with a rotating hinge, slide track, flip mechanism, or other coupling device. The display device can open and close over the handheld base, such as when folded, slid, or flipped closed over the additional display device, folded around to the back of the handheld base, or any position in-between approximately zero degrees (0°) and three-hundred sixty degrees (360°) relative to the handheld base.

The display device 104 includes a display housing 114 that supports various display panels and surfaces that may be utilized to assemble the display device. In this example, the display device includes a front display surface 116 (also referred to as a first display surface), and includes a back display surface 118 (also referred to as a second display surface). The front display surface and the back display surface are viewable from opposite sides of the display device.

A displayed image 120 may be viewable through the front and back display surfaces, and as illustrated, the display device 104 is transparent. As described herein, the transparency of a display device may be a percentage of transparency as measured with light detection equipment and/or as visually determined or perceived by a user when viewing an environment as seen through the various display panels and surfaces of the display device.

In the illustrated examples, a hand may be viewable through the front and back display surfaces of the display device, such as when viewed through the front of the display device. An environment 122 behind the display device can also be viewable through the front and back display surfaces of the display device, and a displayed image may appear projected into the environment for an augmented view of reality. For example, a displayed image 124 of the dog may appear projected into the environment 122 that includes trees and a building behind the display device and viewable through the front and back display surfaces of the display device.

In addition to the front display surface 116 and the back display surface 118, the display device 104 includes a display panel system 126 that is located between the front and back display surfaces. The display panel system is implemented to display images that are then viewable through the front and/or back display surfaces of the display device. The display device may include a light source 128 that illuminates the display panel system for image display. The display device may also include a touch screen 130 that is located between the front and back display surfaces to sense a touch input to either of the front display surface or the back display surface. Alternatively, the display device may include a first touch screen located proximate the front display surface and a second touch screen located proximate the back display surface, and the touch screens sense touch inputs to the respective front and back display surfaces.

The display device 104 also includes a multi-mode panel 132 located between the front display surface 116 and the back display surface 118. In embodiments, the multi-mode panel is operable to switch on and off, such as to prevent an image from being viewable through the front display surface or the back display surface, or for transparency to permit the image being viewable through the front and back display surfaces. The multi-mode panel may be implemented to switch on and/or off the entire panel, sections of the panel, and/or individual pixels of the panel.

In these examples, the display device 104 includes a display panel controller 134 that is implemented to control display modes of the display device for transparent and non-transparent display. The display panel controller can be implemented as computer-executable instructions, such as a software component, and executed by one or more processors to implement various embodiments for a transparent display. In practice, the portable device 102 is implemented with a processor (e.g., a CPU), a graphics processor (e.g., a GPU), and an internal display controller to drive display content to the display device. In the display device 104, the display panel system 126 may include the display panel controller 134 that drives each pixel according to the type of display at various voltages.

In an embodiment, the display panel controller 134 is implemented to invert a viewable perspective of a displayed image when the image is viewable through the back display surface 118. For example, the displayed image 120 that is viewable through the front display surface 116 would appear as a mirror image when viewed through the back display surface if not inverted, or flipped, by the display panel controller so that the displayed image appears in the same perspective when viewed through either of the front or back display surfaces. The display panel controller can be implemented to invert the pixels in each row of a display to reverse an image.

In various configurations, such as when the display device 104 is positioned open relative to the handheld base 106 of the portable device (e.g., as illustrated in the examples), the display panel controller 134 can activate the display device to prevent a displayed image from being viewable through the front display surface 116 or the back display surface 118. Alternatively, the display panel controller can activate the display device for transparency to permit the displayed image being viewable through the front and back display surfaces. Similarly, the display panel controller can activate the display device for a transparent view of the environment 122, which is viewable through the display device. For example, the display panel controller can control and switch on the multi-mode panel 132 of the display device to prevent a displayed image from being viewable through the back display surface, or switch off the multi-mode panel for transparency to permit the displayed image being viewable through the back display surface.

The portable device 102 may be configured as any type of client or user device that includes wired and/or wireless devices, and may be implemented as a consumer, computer (e.g., a laptop or tablet device), portable, communication, phone (e.g., a dual-display phone), appliance, gaming, media playback, and/or electronic device. The portable device can be implemented with one or more processors, data communication components, memory components, navigation components, data processing and control circuits, and a display system. Further, any of the portable devices described herein can be implemented with any number and combination of differing components as further described with reference to the example device shown in FIG. 4.

Figure 2:
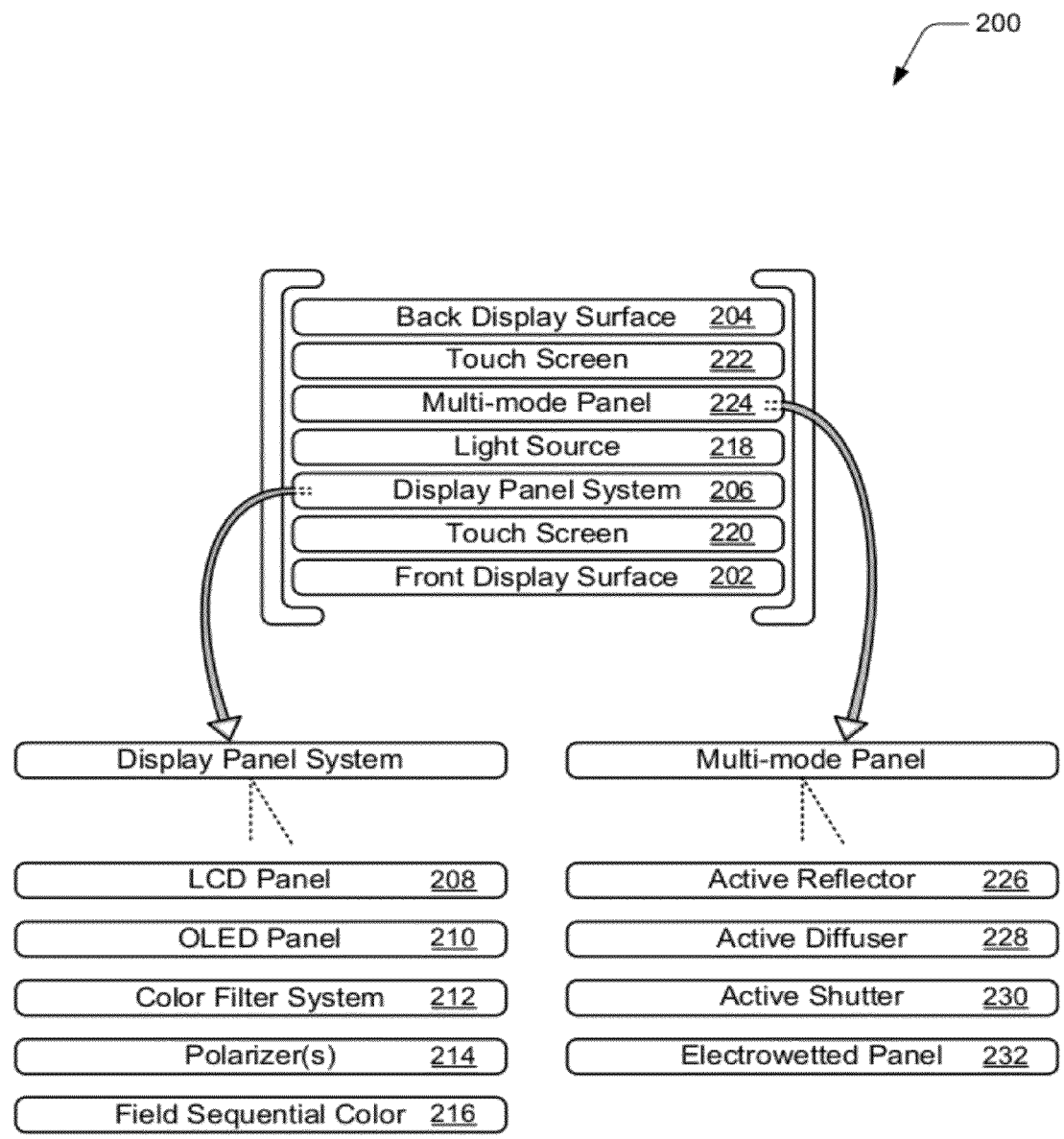
FIG. 2 illustrates an example transparent display assembly in accordance with one or more embodiments.

FIG. 2 illustrates an example transparent display assembly 200 that includes various display panels and surfaces as described above with reference to FIG. 1. Embodiments of a transparent display assembly are implemented to maximize light efficiency and transparency. The transparency of a display device may be diminished, primarily due to polarizers (e.g., in an LCD implementation), color filters, and the light efficiency of a light source used to illuminate a display panel. As described above, the transparency of a transparent display may be a percentage of transparency as measured and/or as visually determined or perceived by a user when viewing through the transparent display assembly.

The transparent display assembly 200 includes a front display surface 202 and a back display surface 204. The front, or first, display surface and the back, or second, display surface are viewable from opposite sides of the transparent display assembly. In addition to the front and back display surfaces, the transparent display assembly includes a display panel system 206 that is located between the front and back display surfaces. The display panel system displays images that are viewable through the front and/or back display surfaces of the transparent display assembly.

In various embodiments, the display panel system 206 may include any one or combination of an LCD panel 208, and OLED panel 210, a color filter system 212 that may be implemented as a passive or active system, one or more polarizers 214 that may be implemented as passive or active, and/or an implementation of field sequential color 216. The transparent display assembly 200 may also include a light source 218 that illuminates the display panel system for image display. In this example, the light source is located or positioned between the display panel system 206 and the multi-mode panel 224. Alternatively, the light source can be implemented as a front-light that is located or positioned between the display panel system and a touch screen 220. The transparent display assembly includes the first touch screen 220 located proximate the front display surface 202 and a second touch screen 222 located proximate the back display surface 204. The touch screens are implemented to sense touch inputs to the respective front and back display surfaces.

The LCD panel 208 can be implemented as a transparent LCD panel. An LCD implementation includes polarizers, and may include an implementation of field sequential color rather than using color filters. The OLED panel 210 can be implemented with transparent panel material for a transparent OLED panel implementation. Alternatively, the OLED panel may include a two-sided direct emitter for a dual-sided display. An active reflector may then be implemented to permit or prevent one side of a display from being viewable. The color filter system 212 can be implemented for a percentage of transparency that permits an image being viewable through the display device. Similarly, the polarizers 214 can be implemented for a percentage of transparency that permits the image being viewable through the display device. In embodiments, an implementation of field sequential color 216 may be utilized in place of the color filters.

The transparent display assembly 200 also includes a multi-mode panel 224 located between the front display surface 202 and the back display surface 204. In embodiments, the multi-mode panel is implemented to switch on and off, such as to prevent an image from being viewable through the front display surface 202 or the back display surface 204, or for transparency to permit the image being viewable through the front and back display surfaces. The multi-mode panel may be implemented to switch on and/or off the entire panel, sections of the panel, and/or individual pixels of the panel. In various embodiments, the multi-mode panel may include any one or combination of an active reflector 226, an active diffuser 228, an active shutter 230, and/or an electrowetted panel 232 implementation.

The active reflector 226 and the active diffuser 228 are implemented to switch on to prevent an image from being viewable through the front display surface 202 or the back display surface 204, and implemented to switch off for transparency to permit the image being viewable through the front and back display surfaces. Similarly, the active shutter 230 is implemented to close to prevent the image from being viewable through the front display surface or the back display surface, and is implemented to open for transparency to permit the image being viewable through the front and back display surfaces. The active reflector 226 can be implemented as a dual-state mirror having a transparent state for transparency, and a reflective state to reflect and recycle light that is lost, such as from an illuminated light guide to illuminate the display. The active shutter 230 can be implemented as an LCD shutter that provides for variable light transmissivity based on an applied voltage. In embodiments, an electrowetting implementation of the electrowetted panel 232 does not include polarizers, and may or may not include color filters. Any of the described multi-mode panel solutions, such as a reflector, diffuser, shutter, or electrowetted panel, can be implemented to operate on the whole panel, sections of the panel, and/or on a pixel-by-pixel basis.

Example method 300 is described with reference to FIG. 3 in accordance with one or more embodiments of transparent display assembly. Generally, any of the functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable memory devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
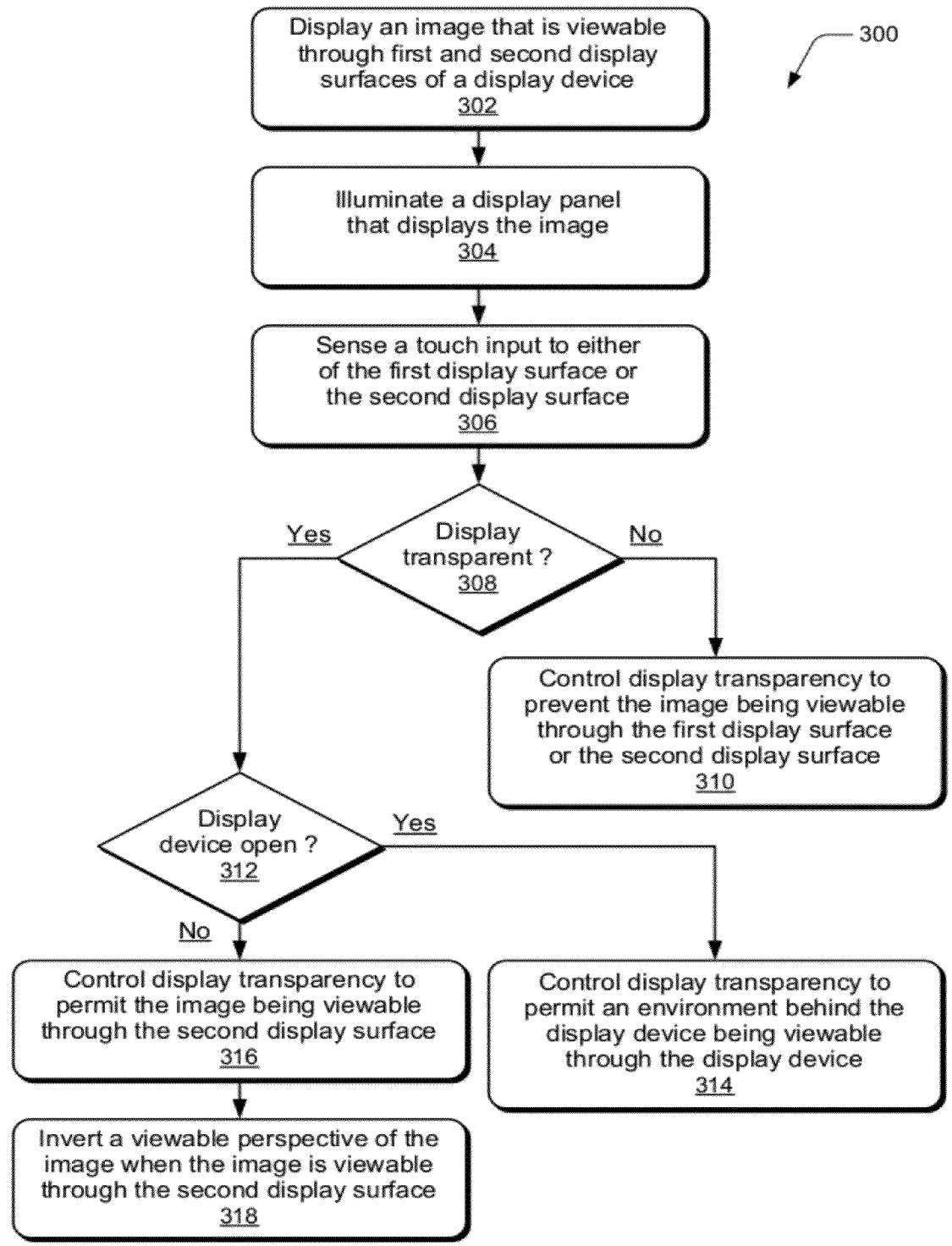
FIG. 3 illustrates example method(s) of transparent display assembly in accordance with one or more embodiments.

FIG. 3 illustrates example method(s) 300 of transparent display assembly. The order in which the method blocks are described are not intended to be construed as a limitation, and any number of the described method blocks can be combined in any order to implement a method, or an alternate method.

At block 302, an image is displayed that is viewable through a first display surface of a display device, and viewable through a second display surface of a display device in a direction opposite to the first display surface. For example, portable device 102 (FIG. 1) includes a display device 104, which has a front display surface 116 (also referred to as a first display surface), and a back display surface 118 (also referred to as a second display surface). The front and back display surfaces are viewable from opposite sides of the display device. The displayed image 120 is viewable through the front and back display surfaces when the display device 104 is operably transparent.

At block 304, a display panel is illuminated to display the image that is viewable through the first and second display surfaces. For example, the light source 218 (FIG. 2) illuminates the display panel system 206 for image display, such as when an LCD panel is illuminated with an LED and a light guide, or other light source.

At block 306, a touch input to either of the first display surface or the second display surface is sensed. For example, the transparent display assembly 200 includes a first touch screen 220 located proximate the front display surface 202 and a second touch screen 222 located proximate the back display surface 204, and the touch screens sense touch inputs to the respective front and back display surfaces.

At block 308, a determination is made as to whether the display is to be initiated for transparent display. If the display device is not initiated for transparent display (i.e., "no" from block 308), then at block 310, display transparency is controlled to prevent the image from being viewable through the front display surface or the second display surface. For example, the display panel controller 134 controls the display transparency to prevent the displayed image 120 from being viewable through the back display surface 118 of the display device 104, while the image is viewable through the front display surface 116 of the display device. In an implementation, the display panel controller controls the multi-mode panel 132 of the display device, and switches the multi-mode panel on to prevent the displayed image from being viewable through the back display surface.

If the display device is initiated for transparent display (i.e., "yes" from block 308), then at block 312, a determination is made as to whether the display device is open or closed. If the display device is open (i.e., "yes" from block 312), then at block 314, display transparency is controlled to permit an environment behind the display device being viewable through the display device. For example, the environment 122 behind the display device 104 is viewable through the front and back display surfaces of the display device. if the display device is closed (i.e., "no" from block 312), then at block 316, display transparency is controlled to permit the image being viewable through the second display surface. For example, the display panel controller 134 controls the display transparency to permit the displayed image 120 being viewable through the back display surface 118 of the display device 104. In an implementation, the display panel controller controls the multi-mode panel of the display device, and switches the multi-mode panel off for transparency.

At block 318, a viewable perspective of the image is inverted when the image is viewable through the second display surface. For example, the display panel controller 134 inverts a viewable perspective of the displayed image 120 when the image is viewable through the back display surface 118 so that the displayed image appears in the same perspective when viewed through either of the front or back display surfaces of the display device. The display panel controller also inverts and/or rotates displayed images as the orientation and/or configuration of the portable device changes.

Figure 4:
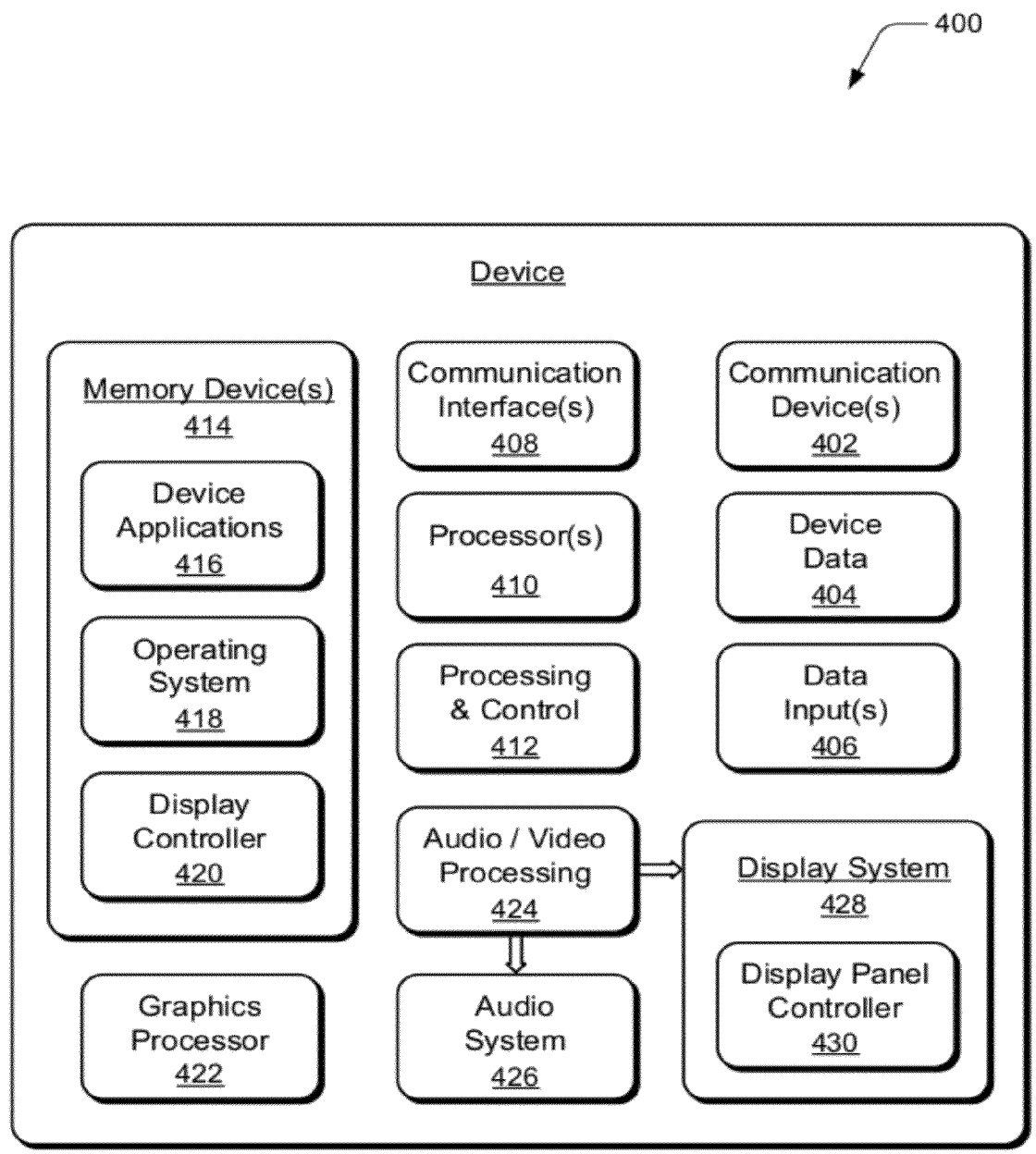
FIG. 4 illustrates various components of an example device that can implement embodiments of transparent display assembly.

FIG. 4 illustrates various components of an example device 400 that can be implemented as a portable device as described with reference to any of the previous FIGS. 1-3. In embodiments, the device may be implemented as any one or combination of a fixed or mobile device, in any form of a consumer, computer, portable, user, communication, phone, navigation, television, appliance, gaming, media playback, and/or electronic device. The device may also be associated with a user (i.e., a person) and/or an entity that operates the device such that a device describes logical devices that include users, software, firmware, hardware, and/or a combination of devices.

The device 400 includes communication devices 402 that enable wired and/or wireless communication of device data 404, such as received data, data that is being received, data scheduled for transmission, data packets of the data, etc. The device data or other device content can include configuration settings of the device, media content stored on the device, and/or information associated with a user of the device. Media content stored on device can include any type of audio, video, and/or image data. The device includes one or more data inputs 406 via which any type of data, media content, and/or inputs can be received, such as user-selectable inputs, messages, communications, music, television content, recorded video content, and any other type of audio, video, and/or image data received from any content and/or data source.

The device 400 also includes communication interfaces 408, such as any one or more of a serial, parallel, network, or wireless interface. The communication interfaces provide a connection and/or communication links between the device and a communication network by which other electronic, computing, and communication devices communicate data with the device.

The device 400 includes one or more processors 410 (e.g., any of microprocessors, controllers, and the like) which process various computer-executable instructions to control the operation of the device. Alternatively or in addition, the device can be implemented with any one or combination of software, hardware, firmware, or fixed logic circuitry that is implemented in connection with processing and control circuits which are generally identified at 412. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 400 also includes one or more memory devices 414 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like.

Computer readable media can be any available medium or media that is accessed by a computing device. By way of example, and not limitation, computer readable media may comprise storage media and communications media. Storage media include volatile and non-volatile, removable and non-removable media implemented in any method or technology for storage of information, such as computer-readable instructions, data structures, program modules, or other data. Storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computer.

Communication media typically embody computer-readable instructions, data structures, program modules, or other data in a modulated data signal, such as carrier wave or other transport mechanism. Communication media also include any information delivery media. The term modulated data signal means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

A memory device 414 provides data storage mechanisms to store the device data 404, other types of information and/or data, and various device applications 416. For example, an operating system 418 and a display controller 420 can be maintained as software applications with a memory device and executed on the processors. The device applications may also include a device manager, such as any form of a control application, software application, signal processing and control module, code that is native to a particular device, a hardware abstraction layer for a particular device, and so on.

The device 400 may also include a graphics processor 422, and includes an audio and/or video processing system 424 that generates audio data for an audio system 426 and/or generates display data for a display system 428. The audio system and/or the display system may include any devices that process, display, and/or otherwise render audio, video, display, and/or image data. For example, the display system includes a display panel controller 430. Display data and audio signals can be communicated to an audio device and/or to a display device via an RF (radio frequency) link, S-video link, composite video link, component video link, DVI (digital video interface), analog audio connection, or other similar communication link. In implementations, the audio system and/or the display system are external components to the device. Alternatively, the audio system and/or the display system are integrated components of the example device.

Although embodiments of transparent display assembly have been described in language specific to features and/or methods, the subject of the appended claims is not necessarily limited to the specific features or methods described. Rather, the specific features and methods are disclosed as example implementations of transparent display assembly.

The invention claimed is:

1. A display device, comprising:
    a first display surface through which an image is viewable;
    a second display surface through which the image is viewable, the second display surface and the first display surface viewable from opposite sides of the display device;
    a display panel system located between the first display surface and the second display surface, the display panel system configured to display the image; and
    a multi-mode panel located between the first display surface and the second display surface, the multi-mode panel operable to permit the image being viewable through the first and second display surfaces, the multi-mode panel further operable to prevent the image from being viewable through at least one of the first display surface or the second display surface, and including an active reflector configured to switch off for transparency to permit the image being viewable through the first and second display surfaces.

2. A display device as recited in claim 1, wherein the active reflector is further configured to switch on to prevent the image from being viewable through the first display surface or the second display surface.

3. A display device as recited in claim 1, wherein the multi-mode panel further comprises an active diffuser configured to switch on to prevent the image from being viewable through the first display surface or the second display surface, and further configured to switch off for transparency to permit the image being viewable through the first and second display surfaces.

4. A display device as recited in claim 1, wherein the multi-mode panel further comprises an active shutter configured to close to prevent the image from being viewable through the first display surface or the second display surface, and further configured to open for transparency to permit the image being viewable through the first and second display surfaces.

5. A display device as recited in claim 1, wherein the display panel system comprises at least one of an LCD panel, or an OLED panel.

6. A display device as recited in claim 5, further comprising a light source configured to illuminate the display panel system for image display.

7. A display device as recited in claim 5, further comprising a color filter system configured for a percentage of transparency that permits the image being viewable through the first and second display surfaces, the color filter system configured as at least one of an active color filter system or a passive color filter system.

8. A display device as recited in claim 5, further comprising a polarizer of the LCD panel configurable for a percentage of transparency that permits the image being viewable through the first and second display surfaces, the polarizer configured as at least one of an active polarizer or a passive polarizer.

9. A display device as recited in claim 1, further comprising a display panel controller configured to invert a viewable perspective of the image when the image is viewable through the second display surface.

10. A display device as recited in claim 1, further comprising a display panel controller operable to control the multi-mode panel for transparency based on at least one of all of a display, a section of the display, a pixel of the display, or a set of pixels of the display.

11. A display device as recited in claim 1, further comprising a touch screen located between the first display surface and the second display surface, the touch screen configured to sense a touch input to either of the first display surface or the second display surface.

12. A display device as recited in claim 1, further comprising a first touch screen proximate the first display surface and a second touch screen proximate the second display surface, the first and second touch screens configured to sense touch inputs to the respective first and second display surfaces.

13. A transparent display, comprising:
a display panel system located between a first display surface and a second display surface, the first display surface and the second display surface viewable from opposite sides of the transparent display, the display panel system configured to display an image that is viewable through the first display surface and viewable through the second display surface; and
a multi-mode panel operable to permit the image being viewable through the first and second display surfaces, the multi-mode panel further operable to prevent the image from being viewable through at least one of the first display surface or the second display surface, and including an active diffuser configured to switch off for transparency to permit the image being viewable through the first and second display surfaces.

14. A transparent display as recited in claim 13, wherein the multi-mode panel further comprises an active reflector configured to switch on to prevent the image from being viewable through the first display surface or the second display surface, and further configured to switch off for transparency to permit the image being viewable through the first and second display surfaces.

15. A transparent display as recited in claim 13, wherein the display panel system comprises at least one of an OLED panel, or an LCD panel with a light source configured to illuminate the LCD panel for image display.

16. A transparent display as recited in claim 13, further comprising a display panel controller configured to invert a viewable perspective of the image when the image is viewable through the second display surface.

17. A method, comprising:
displaying an image that is viewable through a first display surface of a display device, and viewable through a second display surface of the display device in a direction opposite to the first display surface; and
controlling display transparency through use of a multi-mode panel located between the first display surface and the second display surface operable to permit the image being viewable through the first and second display surfaces, the multi-mode panel including an active reflector or an active diffuser configured to switch off for transparency to permit the image being viewable through the first and second display surfaces.

18. A method as recited in claim 17, further comprising illuminating an LCD panel configured to display the image that is viewable through the first and second display surfaces.

19. A method as recited in claim 17, further comprising inverting a viewable perspective of the image when the image is viewable through the second display surface.

20. A method as recited in claim 17, wherein said controlling display transparency further comprises preventing the image from being viewable through the first display surface or the second display surface.

* * * * *